United States Patent [19]
Johnson

[11] Patent Number: 5,375,887
[45] Date of Patent: Dec. 27, 1994

[54] PLUMBING HOOKUP KIT

[76] Inventor: Dwight N. Johnson, 6327 Chorlito Dr., Carlsbad, Calif. 92008

[21] Appl. No.: 80,488

[22] Filed: Jun. 21, 1993

[51] Int. Cl.⁵ .......................................... F16L 25/00
[52] U.S. Cl. .................................. 285/12; 285/341; 285/249; 285/334.1
[58] Field of Search ................. 285/12, 39, 341, 249, 285/334.1

[56] References Cited

U.S. PATENT DOCUMENTS

| | | | |
|---|---|---|---|
| 2,131,509 | 9/1938 | Goepel et al. | 285/334.1 |
| 2,152,975 | 4/1939 | Sanford | 285/249 |
| 3,972,547 | 8/1976 | Itoya | 285/341 |
| 4,589,688 | 5/1986 | Johnson . | |
| 4,770,446 | 9/1988 | Keller | 285/249 |
| 4,848,802 | 7/1989 | Wolf et al. | 285/341 |
| 4,991,876 | 2/1991 | Mulvey | 285/39 |
| 5,024,419 | 6/1991 | Mulvey | 285/341 |
| 5,060,689 | 10/1991 | Csaszar et al. | 285/12 |
| 5,165,727 | 11/1992 | Valley | 285/12 |

Primary Examiner—Eric K. Nicholson
Attorney, Agent, or Firm—Mason, Kolehmainen, Rathburn & Wyss

[57] ABSTRACT

A plumbing hookup kit includes a length of flexible tubing having terminals mounted on each end; different sized brass compression nuts; a brass ferrule; a pair of identical plastic sealing sleeves of one size and a pair of identical plastic sealing sleeves of another size; four identical split locking ring components, pairs of which are adapted to be combined into a locking ring; a pair of identical sealing rings of one size and another larger sealing ring. Different components of the plumbing hookup kit enable the establishment of a fluid tight connection between any of a number of different male threaded fittings in ⅜", 7/16" and ½" sizes, each of the type that cooperates with a corresponding one of a plurality of coupling nuts.

24 Claims, 4 Drawing Sheets

PLUMBING HOOKUP KIT

BACKGROUND OF THE INVENTION

1. Field of the Invention

The present invention relates generally to a plumbing repair kit, and, more particularly, to a new and improved plumbing hookup kit that has a wide range of applications for an extensive variety of plumbing fitting sizes and types.

2. Description of the Prior Art

When a plumbing device, such as a faucet assembly, a toilet tank fill valve or ball cock, an icemaker or a dishwasher, is installed or replaced, a significant amount of difficulty frequently is encountered in establishing the water supply hookup to the plumbing device. A major cause of this difficulty is due to the wide variety of fitting types and sizes to which connections need to be made.

The connection to the water supply is typically made by a length of tubing extending between a water supply source and the inlet of the device to be connected to the water supply source. The water supply source might be a shutoff valve, a pipe coupling or an adaptor provided with a compression fitting in any of a variety of sizes. The sizes of such fittings typically may be ⅜", 7/16" or ½". The task of completing the hookup is further complicated by the fact that the inlet of the device to be connected to the water supply source might be a faucet shank fitting, a toilet tank fill valve fitting, or some other compression or slip fitting of a different size.

One way in which the water supply sources were connected to these various devices was by obtaining a hookup device or kit in the form of a length of tubing having coupling components of specific sizes and types at each end. As a result, the installer would have to obtain a particular hookup device having a coupling at one end to match the particular size and type of fitting for the water supply source and a coupling at the other end to match the particular fitting with which the plumbing device was provided. Consequently, manufacturers, distributors and retailers necessarily would have to provide a large number of different hookup devices or kits, each of which is designed for a hookup between fittings of a particular size and type. For example, a hardware store may offer a dozen or more different hookup devices or kits from which a purchaser must attempt to select the specific one that has the proper fitting sizes and types of couplings at its ends in order to accomplish a particular hookup.

In order to overcome the problem of having to provide a different hookup device or kit for each different plumbing hookup installation, the inventor of the present application did develop a plumbing hookup kit that could be used to connect devices to a water supply source even though the fittings for the devices and the water supply source were of different sizes and types. The plumbing hookup kit that was so developed is disclosed in U.S. Pat. No. 4,589,688 that issued on May 20, 1986. The hookup kit disclosed in that patent includes a length of tubing, an annular terminal at each end of the tubing, a seal ring, and a number of adaptor sleeves. By installing the seal ring on the annular terminal or by installing the seal ring as well as one of the adaptor sleeves on the annular terminal, the hookup kit could be used to interconnect any number of different male threaded fittings which are adapted to cooperate with a corresponding one of a plurality of different coupling nuts. While the hookup kit disclosed in U.S. Pat. No. 4,589,688 did provide a universal hookup kit, problems occurred with certain of the connections. For example, the rubber seal ring alone was used on the annular terminal for a ⅜" compression type connection. However, the tubing tended to be rotated as the nut was rotated to secure the connection. This was due to the fact that the rubber seal was in frictional contact with both the annular terminal and the compression nut. As a result, the seal and thereby the terminal and the tubing connected to the terminal rotated as the nut was being tighten causing the tubing to become twisted. In another situation, the plumbing hookup disclosed in U.S. Pat. No. 4,589,688 did not maintain a water tight connection when the annular terminal was pushed into the connection. This was due to the fact that nothing prevented the terminal from moving axially within the connection when a force was applied to the terminal. When the terminal moved in this manner, the rubber seal no longer maintained its sealing relationship with the inside of the coupling.

SUMMARY OF THE INVENTION

Accordingly, an object of the present invention is to provide a new and improved plumbing hookup kit having components capable of effecting connections between a large variety of fitting sizes and types that may be encountered in installing various types of plumbing devices. Other objects of the present invention is to provide a new and improved plumbing hookup kit which is inexpensive and convenient to use; to provide a new and improved plumbing hookup kit that is capable of affecting durable and reliable fluid tight connections between a wide variety of plumbing fitting sizes and types; to provide a new and improved plumbing hookup kit for interconnecting a wide variety of plumbing fitting sizes and types including a flexible tube with terminals secured at both ends, a brass ferrule, plastic sleeves, split locking rings, and seal rings to be used with the split locking rings; and to provide a new and improved plumbing hookup kit that overcomes many of the difficulties and problems encountered when previously obtainable hookup devices and kits were used.

In accordance with these and many other objects of the present invention, a plumbing hookup kit embodying the present invention provides plumbing components for effecting a connection to any of a number of different male threaded fittings each of the type that cooperates with a corresponding one of a plurality of different coupling nuts. The kit includes a length of flexible tubing so that the tubing can be bent and formed to extend between water supply sources or a water supply source and an inlet fitting which are located at various locations. The tubing has a terminal mounted on each end that is adapted to receive the other components in the kit to effect the connection to a particular type of connection. In order to couple one of the terminals to a ⅜" compression type fitting, the kit includes a ⅜" brass compression nut and a brass ferrule. The compression nut and brass ferrule are disposed on the terminal and as the compression nut is threaded onto the fitting, the brass ferrule is compressed such that a fluid tight connection is established between the tubing and the fitting. A 7/16" brass compression nut and a plastic sealing sleeve is used from the kit to connect the tubing to a 7/16" compression type fitting. The sealing sleeve is maintained on the terminal by flexible fingers that engage a recess in the terminal. As the compression nut is tightened onto the fitting, the compression of the sealing sleeve between the nut and the fitting results in a fluid tight connection between the fitting and the tubing. In the case of ⅜" compression fitting, a similar, but larger plastic sealing sleeve is provided in the kit as well as a ⅜" compression nut. The sealing sleeve is used in the same manner to effect the fluid tight seal between the ⅜" compression fitting and the tubing. The kit also enables the tubing to be connected to a ½" pipe fitting such as an inlet for a faucet or to be connected to the inlet fitting for a toilet. In order to so connect the tubing, the kit includes split locking rings and different sized sealing rings. The split locking rings are positioned about the terminal in a recess on the terminal and are secured on the terminal by the appropriate sized sealing ring. The sealing rings are made of rubber and will establish the fluid tight seal between the tubing and the fitting as the nut is threaded onto the fitting. Advantageously, a single plumbing hookup kit can be used even though a number of different combinations of connections might have to be interconnected.

BRIEF DESCRIPTION OF THE DRAWING

These and other objects and advantages of the present invention will become readily apparent upon consideration of the following detailed description of the embodiment of the invention shown in the accompanying drawings wherein.

DETAILED DESCRIPTION OF THE PREFERRED EMBODIMENT

Figure 1:
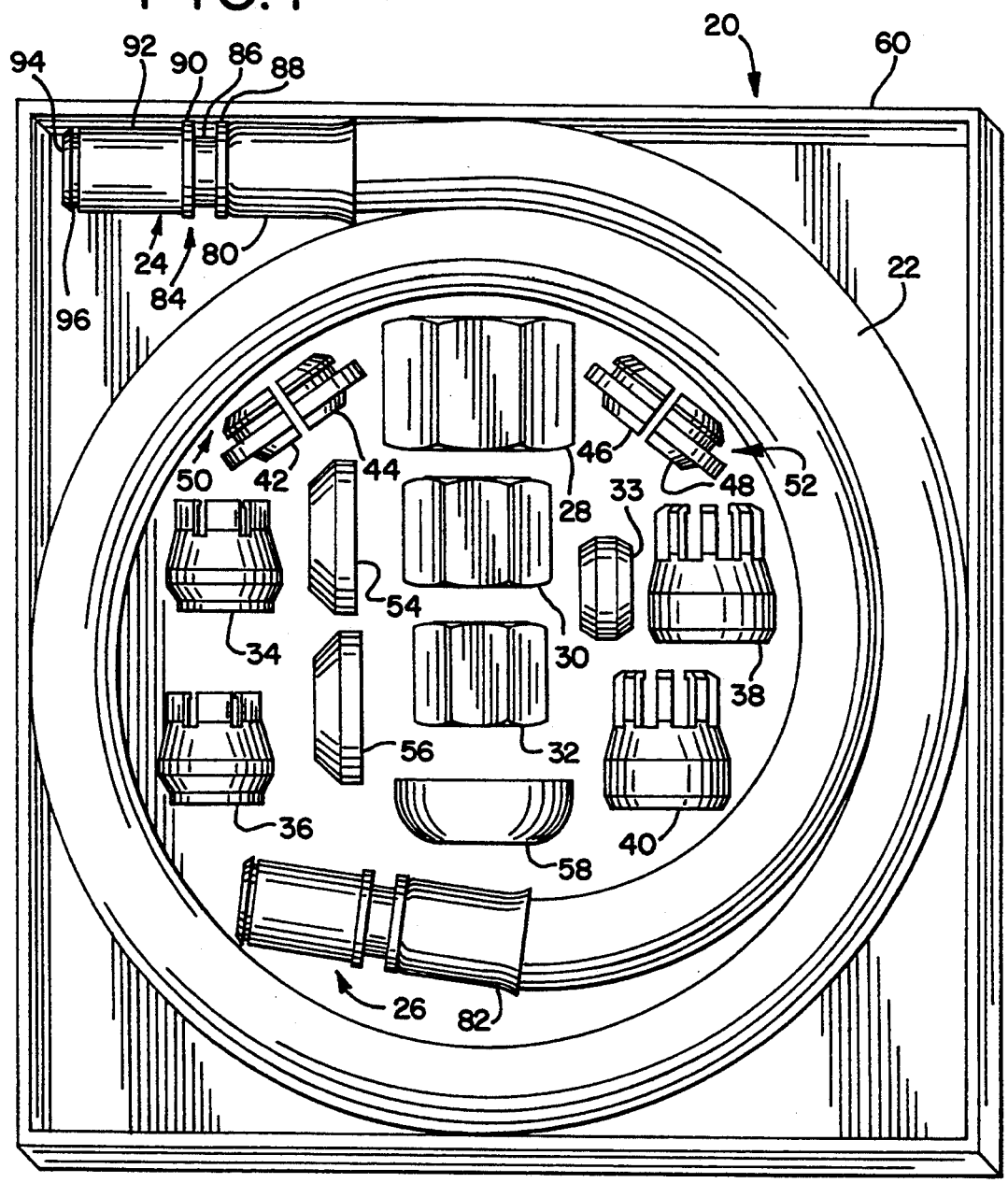
FIG. 1 is a top plan view of a plumbing hookup kit embodying the present invention.

Referring now more specifically to FIG. 1 of the drawings, therein is disclosed a plumbing hookup kit generally designated by the reference numeral 20 and embodying the present invention. The plumbing hookup kit 20 includes a length of flexible tubing 22 having a terminal 24 mounted on one end and another identical terminal 26 mounted on the opposite end; different sized brass compression nuts 28, 30 and 32; a brass ferrule 33; a pair of identical plastic sealing sleeves 34 and 36 of one size and a pair of identical plastic sealing sleeves 38 and 40 of another size; four identical split locking ring components 42, 44, 46 and 48, the components 42 and 44 being adapted to be combined into a locking ring 50 and the components 46 and 48 being adapted to be combined into a locking ring 52; a pair of identical sealing rings 54 and 56 of one size and another larger sealing ring 58. These components of the kit 20 may be supplied in a single package or container 60 of any desired type or shape.

Figure 2:
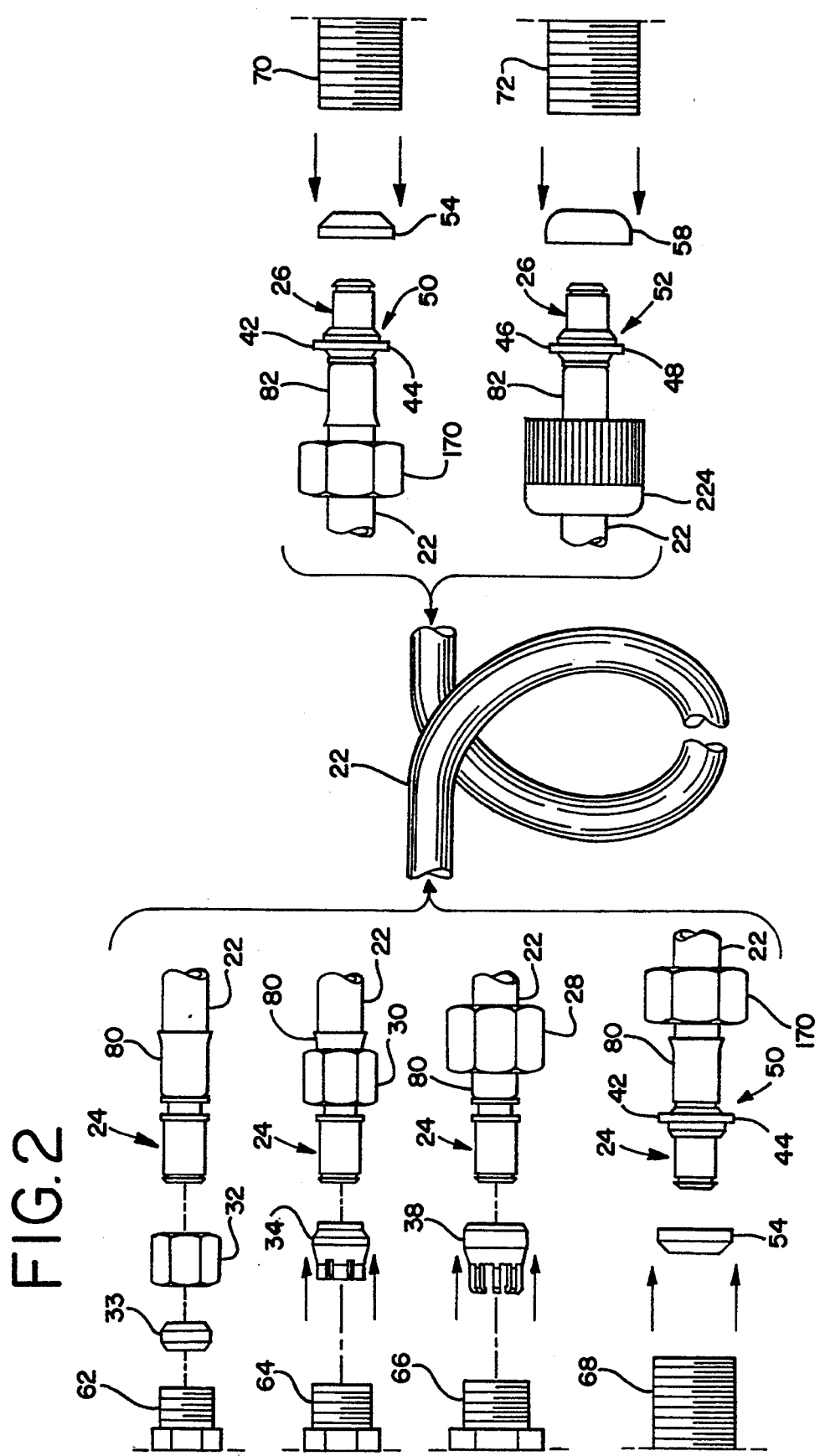
FIG. 2 is a side elevational view, partly diagrammatic, illustrating the various plumbing fittings that can be interconnected by the plumbing hookup kit of FIG. 1.

As is diagrammatically illustrated in FIG. 2 of the drawings, the components supplied in the plumbing hookup kit 20 can be used to interconnect various different water supply connections 62, 64, 66 or 68 to another water supply connection, a faucet assembly or a plumbing appliance or device generally represented by a water connection 70 or a toilet fixture connection 72. Advantageously, a single plumbing hookup kit 20 can be used even though a number of different combinations of connections might have to be interconnected. Consequently, the installer needs to use only the single kit 20. As will be described in more detail below, the components supplied in the kit 20 enables the tubing 22 with the terminal 24 attached to one end thereof to be attached in fluid tight relationship to any one of the connections 62, 64, 66 or 68 and with the terminal 26 attached to the other end thereof to be attached in fluid tight relationship to either connection 70 or the connection 72 by the various components supplied in the kit 20.

The tubing 22 is formed of a suitable flexible material compatible with fluids that will be flowing through the tubing 22. It is necessary for the tubing 22 to be sufficiently flexible so that the tubing 22 can be bent and formed to extend between water supply sources or a water supply source and an inlet fitting which are located at various locations. While a number of different materials can be used for the tubing 22, the core of the tubing 22 preferably can be made of an ethylene propylene material covered externally with an braided material such as 210 denier nylon.

The identical terminals 24 and 26 are included at each end of the tubing 22. The terminals 24 and 26 may be made of metal, rigid plastic or some other hard and strong material. One preferred material from which the terminals 24 and 26 can be made is acetal. As is for example illustrated in connection with the terminal 24 in FIGS. 1-3, one end of the terminal 24 is a shank portion 74 having external serrations 76. The shank portion 74 is adapted to be received within an interior or inner bore 78 of the tubing 22 such that the serrations 76 grip the interior 78 of the tubing 22 to maintain the terminal 24 in the interior 78 of the tubing 22. In order to secure the terminal 24 within the interior 78 at one end of the tubing 22, a swaged or crimped ferrule 80 is positioned about the outer portion of the tubing 22 where the shank portion 74 is positioned. A similar swaged or crimped ferrule 82 is used to maintain in the same manner the terminal 26 at the other end of the tubing 22.

A coupling portion 84 of the terminal 24 extends from the shank portion 74 and extends beyond the end of the tubing 22 when the terminal 24 is secured in the end of the tubing 22. The coupling portion 84 includes a cylindrical recess or neck 86 that is defined between a pair of annular collars or raised portions 88 and 90. The coupling portion 84 in addition includes an elongated cylindrical mounting portion 92 that extends from the collar 90 to a tip or distal end 94 of the terminal 24. A small cylindrical groove or recess 96 is formed in the elongated mounting portion 92 adjacent the tip 94. An axial passageway or bore 98 extends from the tip 94 throughout the length of the terminal 24 so as to be in alignment and in communication with the interior or bore 78 of the tubing 22 when the terminal 24 is positioned at the end of the tubing 22.

Figure 3:
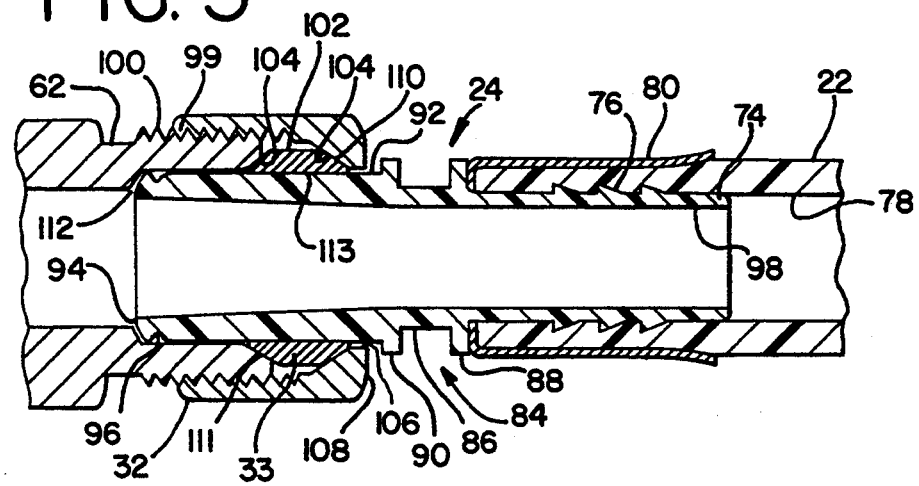
FIG. 3 is a cross-sectional view illustrating the components of the plumbing hookup kit of FIG. 1 in assembled relationship for a ⅜" compression type fitting hookup of the type illustrated in FIG. 2 of the drawings.

As is illustrated in FIGS. 2 and 3, the plumbing hookup kit 20 can be used to interconnect the supply connection 62 to a faucet connection 70 or a toilet connection 72. The supply connection 62 may be a ⅜" compression type fitting. In such a case, the ferrule 33 and the ⅜" compression nut 32 from the kit 20 are used along with the tubing 22. The compression nut 32 is a standard ⅜" compression coupling nut that has internal threads 99 that are adapted to mate with external threads 100 of the supply connection 62. The ferrule 33 is a brass component having a cylindrical central barrel portion 102 with relatively gradual or shallow sloped or angled walls 104 extending outwardly from the central barrel portion 102.

In order to connect the tubing 22 to the water supply connection 62, the compression nut 32 is positioned on the mounting portion 92 of the terminal 24 by inserting the tip 94 through a central aperture 106 in a rear wall 108 of the compression nut 32. The aperture 106 is smaller in diameter than the collar 90 so that the coupling nut 32 will be positioned about the mounting portion 92 adjacent the collar 90. The brass ferrule 33 then is slid onto the mounting portion 92 of the terminal 24 so as to be disposed within the compression nut 32. As the threads 99 of the compression nut 32 are threaded onto the threads 100 of the fitting 62, a beveled or sloped inner surface 110 of the rear wall 108 engages one of the sloped walls 104 of the ferrule 33 while the other sloped wall 104 of the ferrule 33 is forced against a sloped inner radius 111 of the fitting 62 at the end of a bore 112 of the fitting 62. The forces exerted by the radius 111 of the fitting 62 against the gradual sloped wall 104 of the ferrule 33 will tend to compress the ferrule 33 and force an inner bore 113 of the ferrule 33 against the mounting portion 92 of the terminal 24. As a result, the ferrule 33 will be wedged between the radius 111 and the terminal 24 so that the ferrule 33 and thereby the terminal 24 will not be able to rotate as the compression nut 32 is further tighten because the force exerted by the inner wall 110 of the compression nut 32 against the other sloped wall 104 is not great enough to overcome the compressive force caused by the wedging of the radius 111 against the sloped wall 104 of the ferrule 33. Consequently, the tubing 22 will not become twisted as the connection is being made.

As the compression nut 32 is further tightened onto the fitting 62, the forces on the sloped walls 104 tend to deform the ferrule 33 further such that the sloped wall 104 forms a fluid tight seal at the radius 111 of the fitting 62. As a result, a fluid tight seal is formed between the outer surface of the ferrule 33 and the fitting 62. Due to the deformation of the ferrule 33, a fluid tight seal also is formed between the inner bore 113 of the ferrule 33 and the mounting portion 92 of the terminal 24. Consequently, a fluid tight seal is formed about the terminal 24 on the end of the tubing 22 so that fluid will flow from the bore 112 of the fitting 62 only through the interior 78 of the terminal 24 into the tubing 22.

Figure 4:
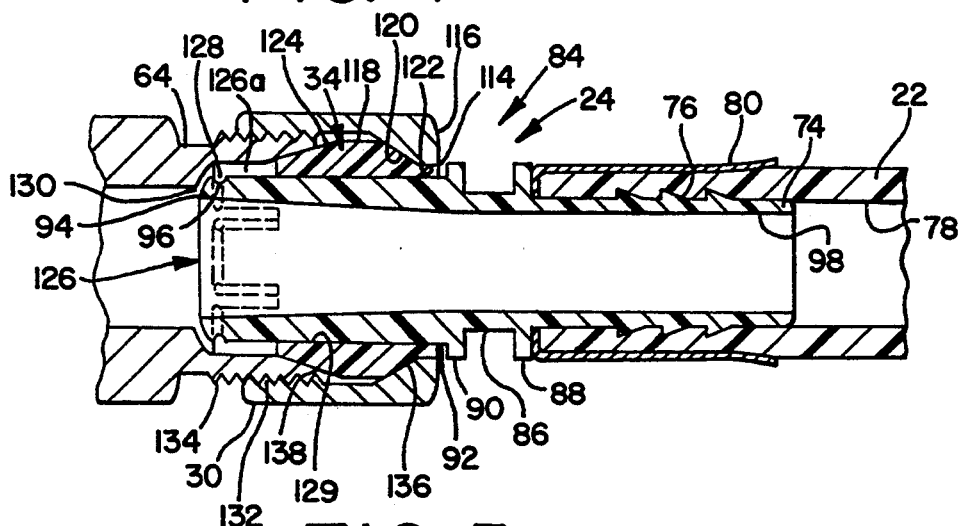
FIG. 4 is a cross-sectional view illustrating the components of the plumbing hookup kit of FIG. 1 in assembled relationship for a 7/16" compression type fitting hookup of the type illustrated in FIG. 2 of the drawings.

Components of the plumbing hookup kit 20 also can be used for connecting the tubing 22 to the fitting 64 which can be for example a 7/16" compression type fitting. As is illustrated in FIGS. 2 and 4 of the drawings, the terminal 24 and thereby the tubing 22 is interconnected to the fitting 64 by using the 7/16" compression nut 30 and one of the plastic sealing sleeves 34 from the plumbing hookup kit 20.

A central aperture 114 in a rear wall 116 of the compression nut 30 has a sufficiently large inner diameter that the compression nut 30 can be slid over the mounting portion 92 and the collars 88 and 90 to be positioned, as is shown in FIG. 2, generally about the crimped ferrule 80. The plastic sealing sleeve 34 then is slid onto the mounting portion 92 in the direction indicated by the arrows in FIG. 2.

The plastic sealing sleeve 34 can be made of a plastic material such as acetal and has a central cylindrical barrel portion 118 from which extends an inwardly tapered or sloping wall 120 that terminates in a cylindrical end wall 122. The plastic sealing sleeve 34 also has another inwardly tapered or sloping wall 124 that extends in the opposite direction from the barrel portion 118. The sloping wall 124 extends at a relatively gradual or shallow angle with respect to the longitudinal axis of the sealing sleeve 34 whereas the sloping wall 120 extends at a more pronounced or blunt angle with respect to the longitudinal axis of the sealing sleeve 34. For example, the angle between the wall 124 and the longitudinal axis of the sealing sleeve 34 may be preferably 15 degrees and the angle between the wall 120 and the longitudinal axis of the sealing sleeve 34 may be preferably 45 degrees. The wall 124 terminates in a plurality of resilient fingers 126. As is shown in FIG. 4 with respect to one of the resilient fingers 126a, each of the resilient fingers 126 has a nip 128 extending radially inwardly near the end of the finger 126a.

The sealing sleeve 34 has an inner bore 129 that enables the sealing sleeve 34 to be slid onto the mounting portion 92 of the terminal 24 in the direction indicated by the arrows in FIG. 2 until the end wall 122 lodges against the collar 90 and the nips 128 on the fingers 126 become resiliently lodged in the recess 96 near the tip 94 of the terminal 24. With the nips 128 so lodged in the recess 96, the sealing sleeve 34 is secured in position on the terminal 24, but is nevertheless free to rotate with respect to the mounting portion 92. Advantageously, the resiliency of the fingers 126 not only secure the sealing sleeve 34 on the mounting portion 92 of the terminal 24, but also permits the sealing sleeve 34 to be removed from the terminal 24 even after it has been secured in position on the mounting portion 92. In order to so remove the sealing sleeve 34, the tip 94 of the terminal 24 is placed against a hard surface and pressure is applied on the sealing sleeve 34 in the direction of the tip 94. The resultant force will force the nips 128 against the wall of the recess 96 thereby flexing the resilient fingers 126 radially outwardly a sufficient amount that the nips 128 become dislodged from the recess 96. As a result, the sealing sleeve 34 is no longer locked in place on the terminal 24 and the sealing sleeve 34 can be removed from the terminal 24.

Once the sealing sleeve 34 is locked in position on the terminal 24, the terminal 24 with the sealing sleeve 34 thereon is inserted into a bore 130 of the fitting 64 (see FIG. 4). Internal threads 132 of the compression nut 30 then are threaded onto external mating threads 134 of the fitting 64. As the compression nut 30 is tightened onto the fitting 64, a beveled or sloped inner wall 136 extending from the aperture 114 in the rear wall 116 of the compression nut 30 engages the rear sloped wall 120 of the sealing sleeve 34 and a sloped inner radius 138 on the end of the fitting 64 engages the sloped wall 124 of the sealing sleeve 34. As the compression nut 30 is being tightened onto the fitting 64, the radius 138 will wedge against the gradual sloped wall 124 such that the inner bore 129 of the sealing sleeve 34 is compressed against the mounting portion 92 of the terminal 24. As a result, the sealing sleeve 34 and thereby the terminal 24 are prevented from rotating with respect the fitting 64 because the force exerted on the gradual sloped wall 124 of sealing sleeve 34 is greater than the force exerted by the inner wall 136 of the compression nut 30 on the blunt angled wall 120 of the sealing sleeve 34 as the compression nut 32 is being tightened. Consequently, the tightening of the compression nut 30 will not result in the twisting of the tubing 22 as the connection is being made.

The further tightening of the compression nut 30 results in the radius 138 of the fitting 64 being further wedged against the sloped wall 124 of the sealing sleeve 34 such that a fluid tight seal results at the intersection of the radius 138 and the sloped wall 124. As a result, a fluid tight seal is established along the outer portion of the sealing sleeve 34. The tightening of the compression nut 30 and the resulting compression of the sealing sleeve 34 along the wall 124 also results in a fluid tight seal being formed along the inner bore 129 of the sealing sleeve 34 and the mounting portion 92 of the terminal 24. This sealing of the inner bore 129 against the mounting portion 92 is additionally perfected by the compressive forces caused by the engagement of the beveled wall 136 of the compression nut 30 against the sloped wall 120 of the sealing sleeve 34. Consequently, a fluid tight seal is formed about the terminal 24 on the end of the tubing 22 so that fluid will flow only through the interior 78 of the terminal 24 into the tubing 22 from the fitting 64.

Figure 5:
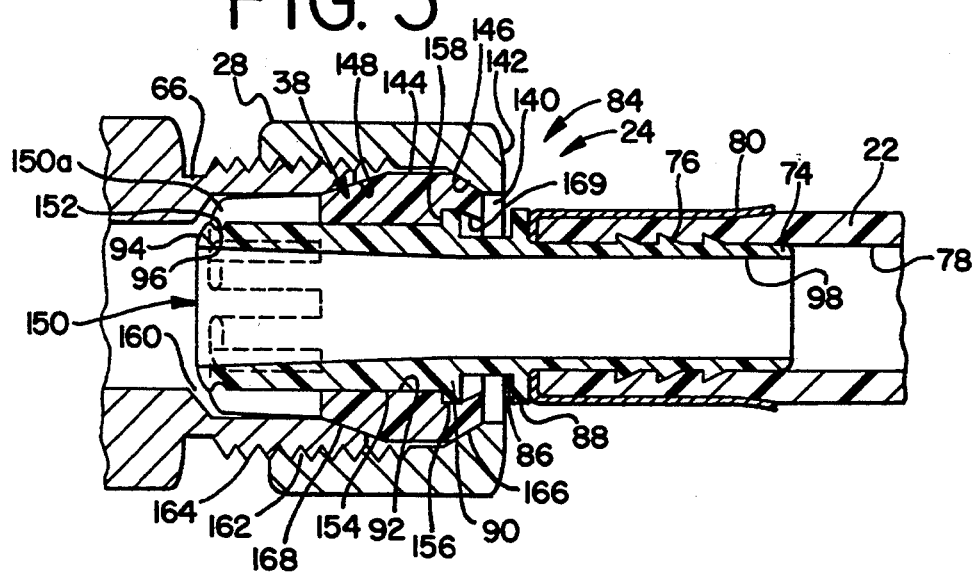
FIG. 5 is a cross-sectional view illustrating the components of the plumbing hookup kit of FIG. 1 in assembled relationship for a ½" compression type fitting hookup of the type illustrated in FIG. 2 of the drawings.

The plumbing hookup kit 20 also provides additional components for connecting the tubing 22 to the fitting 66 which can be for example a ½" compression type fitting. As is illustrated in FIGS. 2 and 5 of the drawings, the terminal 24 and thereby the tubing 22 is interconnected to the fitting 66 by using the ½" compression nut 28 and one of the larger plastic sealing sleeves 38 from the plumbing hookup kit 20.

A central aperture 140 in a rear wall 142 of the compression nut 28 has a sufficiently large inner diameter that the compression nut 28 can be slid over the mounting portion 92 and the collars 88 and 90 to be positioned, as is shown in FIG. 2, generally about the crimped ferrule 80. The plastic sealing sleeve 38 then is slid onto the mounting portion 92 in the direction indicated by the arrows in FIG. 2.

The plastic sealing sleeve 38 made be made of a plastic material such as acetal and has a central cylindrical barrel portion 144 from which extends an inwardly tapered or sloping wall 146. The plastic sealing sleeve 38 also has another inwardly tapered or sloping wall 148 that extends in the opposite direction from the barrel portion 144. The sloping wall 148 extends at a relatively gradual or shallow angle with respect to the longitudinal axis of the sealing sleeve 38 whereas the sloping wall 146 extends at a more pronounced or blunt angle with respect to the longitudinal axis of the sealing sleeve 38. For example, the angle between the wall 148 and the longitudinal axis of the sealing sleeve 38 may be preferably 15 degrees and the angle between the wall 146 and the longitudinal axis of the sealing sleeve 38 may be preferably 45 degrees. The wall 148 terminates in a plurality of resilient fingers 150. As is shown in FIG. 5 with respect to one of the resilient fingers 150a, each of the resilient fingers 150 has a nip 152 extending radially inwardly near the end of the finger 150a.

The sealing sleeve 38 has an inner bore 154 extending from the fingers 150 and a larger inner bore 156 in communication with the bore 154 such that a ledge 158 is formed where the bores 154 and 156 meet. The sealing sleeve 38 is slid onto the terminal 24 such that the mounting portion 92 is slid within the bores 154 and 156 until the ledge 158 contacts the collar 90 (see FIG. 5). When the sealing sleeve 38 is so positioned on the mounting portion 92, the nips 152 on the fingers 150 become resiliently lodged in the recess 96 near the tip 94 of the terminal 24. With the nips 152 so lodged in the recess 96, the sealing sleeve 38 is secured in position on the terminal 24, but the sealing sleeve 38 is nevertheless free to rotate with respect to the mounting portion 92. Advantageously, the resilient fingers 150 not only secure the sealing sleeve 38 on the mounting portion 92 of the terminal 24, but also enables the sealing sleeve 38 to be removed from the terminal 24 even after it has been secured in position on the mounting portion 92. In order to so remove the sealing sleeve 38, the tip 94 of the terminal 24 is placed against a hard surface and pressure is applied on the sealing sleeve 38 in the direction of the tip 94. The resultant force will force the nips 152 against the wall of the recess 96 thereby flexing the resilient fingers 150 radially outwardly a sufficient amount that the nips 152 become dislodged from the recess 96. As a result, the sealing sleeve 38 is no longer locked in place on the terminal 24 and the sealing sleeve 38 can be removed from the terminal 24.

Once the sealing sleeve 38 is locked in position on the terminal 24, the terminal 24 with the sealing sleeve 38 thereon is inserted into a bore 160 of the fitting 66 (see FIG. 5). Internal threads 162 of the compression nut 28 then are threaded onto external mating threads 164 of the fitting 66. As the compression nut 28 is tightened onto the fitting 66, a beveled or sloped inner wall 166 extending from the aperture 140 in the rear wall 142 of the compression nut 28 engages the rear sloped wall 146 of the sealing sleeve 38 and a sloped inner radius 168 on the end of the fitting 66 engages the sloped wall 148 of the sealing sleeve 38. As the compression nut 28 is being tightened onto the fitting 66, the radius 168 will wedge against the gradual sloped wall 148 such that the inner bore 154 of the sealing sleeve 38 is compressed against the mounting portion 92 of the terminal 24. As a result, the sealing sleeve 38 and thereby the terminal 24 are prevented from rotating with respect the fitting 66 because the force exerted on the gradual sloped wall 148 of sealing sleeve 38 is greater than the force exerted by the inner wall 166 of the compression nut 28 on the blunt angled wall 146 of the sealing sleeve 38 as the compression nut 28 is being tightened. Consequently, the tightening of the compression nut 32 will not result in the twisting of the tubing 22 as the connection is being made.

The further tightening of the compression nut 28 results in the radius 168 of the fitting 66 being further wedged against the sloped wall 148 of the sealing sleeve 38 such that a fluid tight seal results at the intersection of the radius 168 and the sloped wall 148. As a result, a fluid tight seal is established along the outer portion of the sealing sleeve 38. The tightening of the compression nut 28 and the resulting compression of the sealing sleeve 38 along the wall 148 also results in a fluid tight seal being formed along the inner bore 154 of the sealing sleeve 38 and the mounting portion 92 of the terminal 24. This sealing of the inner bore 154 against the mounting portion 92 is additionally perfected by the compressive forces caused by the engagement of the beveled wall 166 of the compression nut 28 against the sloped wall 146 of the sealing sleeve 38. In this regard, an end portion 169 of the sealing sleeve 38 tends to be deformed slightly about the collar 90 to further insure that a fluid tight connection is established between the sealing sleeve 38 and the terminal 24. Consequently, a fluid tight seal is formed about the terminal 24 on the end of the tubing 22 so that fluid will flow only through the interior 78 of the terminal 24 into the tubing 22 from the fitting 66.

In FIG. 2, the fitting 68 and the fitting 70 are representative of similar ⅜" pipe threads that might be present on a water supply connection or a faucet inlet. The plumbing hookup kit 20 can be used to connect the tubing 22 to either of those connections 68 and 70. In making such a connection, the same components from the plumbing hookup kit 20 can be used so that only the connection of the tubing 22 to the fitting 68 will be described. However, the description is equally applicable to the connecting of the tubing 22 to the fitting 70.

In order to couple the fitting 68 to the tubing 22, the split locking rings 42 and 44 and the sealing ring 54 are utilized. A coupling nut 170 is not supplied with the plumbing hookup kit 20 because the coupling nut 170 that is normally used with the threaded fitting 68 is reusable whereas compression nuts that are used with the fittings 62, 64 and 66 tend to be damaged after usage so compression nuts 28, 30 and 32 are supplied in the plumbing hookup kit 20.

The coupling nut 170 is of the type having a rear wall 172 through which extends a central aperture 174 and internal threads 176 that are adapted to mate with external threads 178 on the fitting 68. The inner diameter of the central aperture 174 is sufficiently large that the coupling nut 170 can be slid over the terminal 24 including the collars 90 and 88 so as to be positioned about the crimped ferrule 80 as is illustrated in FIG. 2. Thereafter, the split locking rings 42 and 44 are positioned in the recess 86 to form the locking ring 50 and held in that position by the sealing ring or washer 54.

Figure 6:
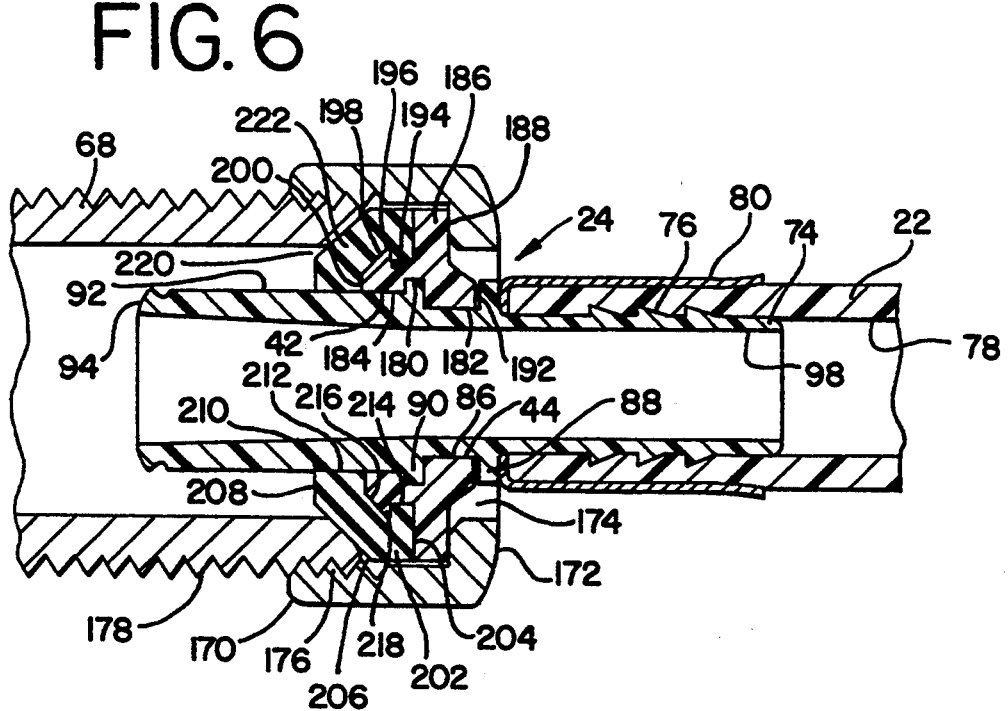
FIG. 6 is a cross-sectional view illustrating the components of the plumbing hookup kit of FIG. 1 in assembled relationship for a ½" pipe or faucet fitting hookup of the type illustrated in FIG. 2 of the drawings.

More specifically as shown in FIGS. 2 and 6 of the drawings, the split locking rings 42 and 44 are identical and are designed to fit onto the terminal 24. The split locking rings 42 and 44 as well as the split locking rings 46 and 48 may be made of an appropriate plastic material such as acetal. As is illustrated in connection with the split locking ring 42, both of the split locking rings 42 and 44 have an annular groove 180 formed on its inner radius between an annular flat or land 182 and an annular flange 184 that extends inwardly a greater distance than the land 182. On the exterior side of the split locking ring 42, an annular collar 186 projects outwardly around the split locking ring 42. A side wall 188 of the collar 186 flows into a beveled or sloped wall portion 190 near an end 192 of the split locking ring 42. An outer annular groove 194 is formed between the collar 186 and a tip 196 of a tapered or sloped wall 198 at the other end 200 of the split locking ring 42. As previously indicated, the split locking rings 42, 44, 46 and 48 are all identical so the same reference numerals for the various portions of the split locking ring 42 are equally applicable to the corresponding portions of the split locking rings 44, 46, and 48.

As is illustrated particularly in FIG. 6, the split locking rings 42 and 44 are adapted to be positioned on the terminal 24 about the collar 90. When the split locking rings 42 and 44 are so positioned, the collar 90 is disposed in the groove 180, the land 182 lies against the mounting portion 92 adjacent to the collar 90 and the flange 184 is disposed within the recess 86.

With the split locking rings 42 and 44 held in position on the terminal 24, the sealing ring 54 is slid over the tip 94 of the terminal 24 in the direction indicated by the arrows in FIG. 2. The sealing ring 54 is formed of a relatively soft resilient material such as, for example, rubber or similar material having a durometer hardness of approximately 70–80. The outer surface of the sealing ring 54 has a flat barrel portion 202 extending from an end wall 204 to a sloped or tapered portion 206 that extends to an opposite end wall 208. A central bore 210 extends through the sealing ring 54 from the end wall 208 to the end wall 204. The bore 210 includes two sections: a larger diameter section 212 near the end wall 204 and a smaller diameter section 214 near the end wall 208. A tapered recess 216 is formed between the sections 212 and 214 and an inwardly extending projection 218 is formed at the end wall 204. The sealing ring 54 can be pushed or rotated along the mounting portion 92 of the terminal 24 toward the formed locking ring 50. As the sealing ring 54 engages the locking ring 50, the projection 218 at the end wall 204 slids along the tapered wall 198 and deforms or expands until the projection 218 becomes lodged in the groove 194. When the projection 218 becomes lodged in the groove 194, the tip 196 of the tapered wall 198 of the locking ring 50 is disposed in the tapered recess 216 of the sealing ring 54 such that the sealing ring 54 is secured about the locking ring 50 and thereby secures or maintains the split locking rings 42 and 44 in the form of the locking ring 50 firmly on the terminal 24 as is shown in FIG. 6 of the drawings.

Once the sealing ring 54 secures the locking ring 50 on the terminal 24, the tip 94 of the terminal 24 can be inserted into an inner bore 220 of the fitting 68 and the threads 176 of the coupling nut 170 can be threaded onto the threads 178 of the fitting 68. As the coupling nut 170 is rotated, the inside surface of the rear wall 172 of the coupling nut 170 engages the collar 186 of the ring 50. The continued rotating of the coupling nut 170 will force the terminal 24 further into the bore 220 of the fitting 68 because the flange 184 of the locking ring 50 is lodged between the collars 88 and 90 in the recess 86 so that any axial force exert on the collar 186 will result in a corresponding axial force being applied to the terminal 24. As the terminal 24 is forced further into the bore 220 of the fitting 68, the tapered wall 206 of the sealing ring 54 engages or is forced against an inner radius 222 at the end of the fitting 68 such that the sealing ring 54 is compressed between the inner radius 222 of the fitting 68 and the collar 186. As a result, a fluid tight seal is established between the sealing ring 54 and the inner radius 222 of the fitting 68. In addition, the compression of the sealing ring 54 forces the inner surface of the bore portion 212 against the mounting portion 92 of the terminal 24 so that a fluid tight seal also is formed between the sealing ring 54 and the terminal 24. Consequently, a fluid tight seal is formed about the terminal 24 on the end of the tubing 22 so that fluid from the bore 220 of the fitting 68 will flow only through the interior 78 of the terminal 24 into the tubing 22.

As the coupling nut 170 is being further tightened on the fitting 68, the compressive forces exerted on the sealing ring 54 at the radius 222 of the fitting 68 prevents the sealing ring 54 as well as the locking rings 42 and 44 and the terminal 24 from being rotated. While the rotation of the coupling nut 170 results in a rotational force being exerted by the rear wall 172 of the coupling nut 170 against the collar 186 of the locking rings 42 and 44, this rotational force is not sufficient to overcome the forces preventing rotation of the terminal 24 exerted by the sealing ring 54. Consequently, the tightening of the coupling nut 170 will not result in the twisting of the tubing 22 as the connection is being made.

The other fitting illustrated in FIG. 2 is the fitting 72 that is representative of inlet to a toilet fixture. The plumbing hookup kit 20 can be used to connect the tubing 22 to the fitting 72. In making such a connection, the split locking rings 46 and 48 and the sealing ring 58 are utilized. A coupling nut 224 is not supplied with the plumbing hookup kit 20 because the coupling nut 224 that is normally used with the threaded fitting 72 is reusable or is supplied with the plumbing fixture from which the fitting 72 extends.

The coupling nut 224 is of the type having a rear wall 226 through which extends a central aperture 228 and internal threads 230 that are adapted to mate with external threads 232 on the fitting 72. The inner diameter of the central aperture 228 is sufficiently large that the coupling nut 224 can be slid over the terminal 26 including the collars 90 and 88 so as to be positioned about the crimped ferrule 82 as is illustrated in FIG. 2. Thereafter, the split locking rings 46 and 48 are positioned in the recess 86 to form the locking ring 52 and held in that position by the sealing ring or washer 58.

Figure 7:
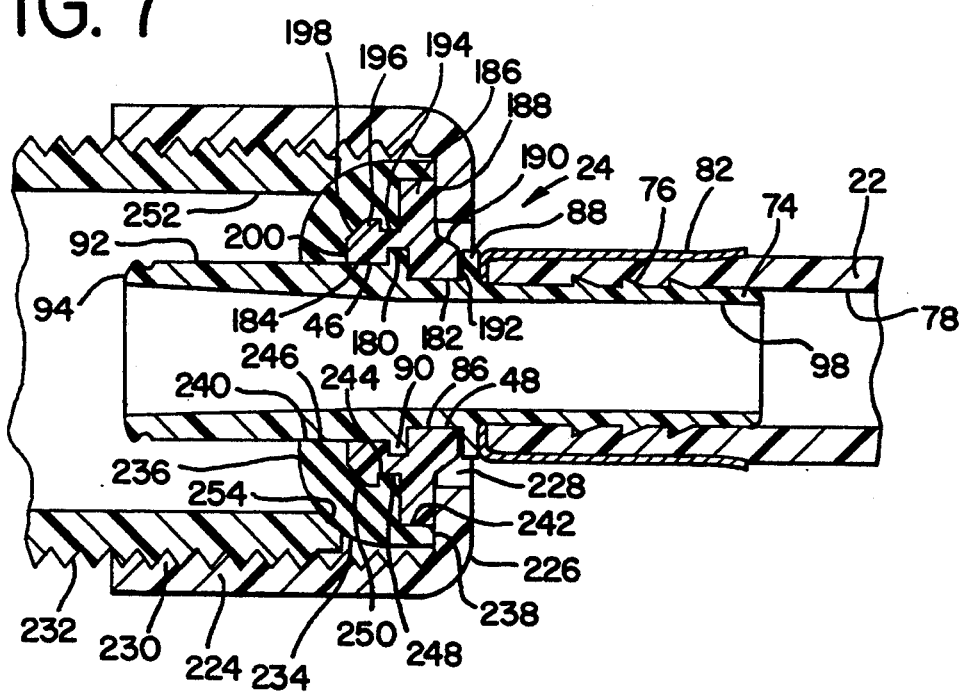
FIG. 7 is a cross-sectional view illustrating the components of the plumbing hookup kit of FIG. 1 in assembled relationship for a toilet inlet fill valve hookup of the type illustrated in FIG. 2 of the drawings.

More specifically as shown in FIGS. 2 and 7 of the drawings, the identical split locking rings 46 and 48 are designed to fit onto the terminal 26. As previously indicated, the split locking rings 46 and 48 are identical to the split locking ring 42 so that the same reference numerals for the various portions of the split locking ring 42 are equally applicable to the corresponding portions of the split locking rings 46 and 48. As is illustrated particularly in FIG. 7, the split locking rings 46 and 48 are adapted to be positioned on the terminal 26 about the collar 90. When the split rings 46 and 48 are positioned to form the locking ring 52, the collar 90 is disposed in the groove 180, the land 182 lies against the mounting portion 92 adjacent to the collar 90 and the flange 184 is disposed within the recess 86.

With the split locking rings 46 and 48 held in position on the terminal 26, the sealing ring 58 is slid over the tip 94 of the terminal 26 in the direction indicated by the arrows in FIG. 2. The sealing ring 58 is formed of a relatively soft resilient material such as, for example, rubber or similar material having a durometer hardness of approximately 70–80. The outer surface of the sealing ring 58 has a curved outer portion 234 extending from an end wall 236 to an opposite end wall 238. A central bore 240 extends through the sealing ring 58 from the end wall 236 to the end wall 238. The central bore 240 includes a larger portion 242 near the end wall 238, a somewhat smaller diameter portion 244, and a smaller diameter portion 246 near the end wall 236. The bore portion 244 is formed by a projection 248 such that a tapered recess 250 is formed between the bore portions 244 and 246. The sealing ring 58 can be pushed or rotated along the mounting portion 92 of the terminal 26 toward the formed locking ring 52 by inserting the tip 94 through the bore portions 242, 244 and 246. As the sealing ring 58 engages the locking ring 52, the projection 248 slides along the tapered wall 198 and deforms or expands until the projection 248 becomes lodged in the groove 194. When the projection 248 becomes lodged in the groove 194, the tip 196 of the tapered wall 198 of the ring 52 is disposed in the tapered recess 250 of the sealing ring 58 and the bore portion 242 is lodged against the outer edge of the collar 186. As a result, the sealing ring 58 is secured about the locking ring 52 and thereby secures or maintains the split locking rings 46 and 48 in the form of the locking ring 52 firmly on the terminal 26 as is shown in FIG. 7 of the drawings.

Once the sealing ring 58 secures the locking ring 52 on the terminal 26, the tip 94 of the terminal 26 can be inserted into an inner bore 252 of the fitting 72 and the threads 230 of the coupling nut 224 can be threaded onto the threads 232 of the fitting 72. As the coupling nut 224 is rotated, the inside surface of the rear wall 226 of the coupling nut 224 engages the collar 186 of the ring 52. The continued rotating of the coupling nut 224 will force the terminal 26 further into the bore 252 of the fitting 72 because the flange 184 of the locking ring 52 is lodged between the collars 88 and 90 in the recess 86 so that any axial force exert on the collar 186 will result in a corresponding axial force being applied to the terminal 26. As the terminal 26 is forced further into the bore 252 of the fitting 72, the outer curved wall 234 of the sealing ring 58 engages or is forced against an inner radius 254 at the end of the fitting 72 such that the sealing ring 58 is compressed between the inner radius 254 of the fitting 72 and the collar 186. As a result, a fluid tight seal is established between the sealing ring 58 and the inner radius 254 of the fitting 72. In addition, the compression of the sealing ring 58 forces the inner surface of the bore portion 246 against the mounting portion 92 of the terminal 26 so that a fluid tight seal also is formed between the sealing ring 58 and the terminal 26. Consequently, a fluid tight seal is formed about the terminal 26 on the end of the tubing 22 so that fluid from the bore 252 of the fitting 72 will flow only through the interior 78 of the terminal 26 into the tubing 22.

As the coupling nut 224 is being further tightened on the fitting 72, the compressive forces exerted on the sealing ring 58 at the radius 254 of the fitting 72 prevents the sealing ring 58 as well as the locking rings 46 and 48 and the terminal 26 from being rotated. While the rotation of the coupling nut 224 results in a rotational force being exerted by the rear wall 226 of the coupling nut 224 against the collar 186 of the locking rings 46 and 448 this rotational force is not sufficient to overcome the forces preventing rotation of the terminal 26 exerted by the sealing ring 58. Consequently, the tightening of the coupling nut 224 will not result in the twisting of the tubing 22 as the connection is being made.

Obviously, many modifications and variations of the present invention are possible in light of the above teachings. Thus, it is to be understood that, within the scope of the appended claims, the invention may be practiced otherwise than as specifically described above.

What is claimed and desired to be secured by Letters Patent of the United States is:

1. A plumbing hookup kit for establishing a fluid tight connection to different fluid connections, each of which said fluid connections including a male threaded fitting of a particular size and type that cooperates with a mating threaded coupling nut, each said coupling nut including an apertured wall, said hookup kit comprising:
- a flexible tubing;
- a pair of generally cylindrical terminal means, one of said pair of terminal means being secured at each end of said tubing with each of said terminal means having a securing portion for securing said terminal means to said tubing and a mounting portion that is adapted to be extended through said apertured wall; and
- a plurality of sealing means each of which sealing means being adapted to be positioned on said mounting portion of at least one of said terminal means and being adapted to connect said terminal means with a particular one of said different fluid connections in a fluid tight relationship when said coupling nut is secured on said fitting of said particular one of said different fluid connections, said plurality of sealing means including at least two of the following sealing means: (1) a ferrule adapted to be positioned on said mounting means, (2) a sealing sleeve adapted to be retained on said mounting means by resilient finger means and (3) split locking ring means adapted to be retained on said mounting portion by a sealing ring means.

2. A plumbing hookup kit as set forth in claim 1 wherein said ferrule is made of brass and includes a central barrel portion and a pair of sloped walls extending in opposite directions from said barrel portion, one of said sloped walls engaging said fitting to which said terminal means is being connected and the other of said sloped walls engaging an angled wall of said coupling nut as said coupling nut is tighten unto said fitting.

3. A plumbing hookup kit as set forth in claim 1 said terminal means has an annular recess adjacent a distal end of said mounting portion and wherein said resilient finger means includes a plurality of resilient fingers, each of which fingers has a nip extending radially inwardly so as to become lodged in said annular recess to maintain said sealing sleeve on said mounting means.

4. A plumbing hookup kit as set forth in claim 3 wherein each of said nips will become dislodged from said recess when said distal end is positioned on a surface and a force is applied to said sealing sleeve toward said distal end.

5. A plumbing hookup kit as set forth in claim 1 wherein said sealing sleeve is made of a plastic material.

6. A plumbing hookup kit as set forth in claim 1 wherein said sealing sleeve includes a central barrel portion and a pair of sloped walls extending in opposite directions from said barrel portion, one of said sloped walls engaging said fitting to which said terminal means is being connected and the other of said sloped walls engaging an angled wall of said coupling nut as said coupling nut is tighten unto said fitting.

7. A plumbing hookup kit as set forth in claim 1 wherein said split locking ring means includes a pair of locking rings having interlocking means to position each of said locking rings on said mounting portion of said terminals means and retaining means to secure said sealing ring means about said pair of locking rings to thereby retain said locking rings in position on said mounting means.

8. A plumbing hookup kit as set forth in claim 7 wherein said interlocking means includes an inwardly extending locking projection to be received in an annular recess in said mounting portion and an inner annular groove for receiving an annular collar on said mounting portion and wherein said retaining means includes an outer annular groove to receive a sealing projection extending inwardly on said sealing ring means.

9. A plumbing coupling assembly for connecting a fluid connection having a male threaded fitting of a particular size and type that cooperates with a mating threaded coupling nut, said coupling nut including an apertured wall, said hookup kit comprising:
- a flexible tubing;
- a generally cylindrical terminal means being secured at least at one end of said tubing, said terminal means having a securing portion for securing said terminal means to said tubing and a mounting portion that is adapted to be extended through said apertured wall, said mounting portion having an annular recess adjacent its tip and at least one annular collar displaced from said tip; and
- a sealing sleeve means having a bore extending therethrough so that said sealing sleeve means can be positioned on said mounting portion, said sealing sleeve means having a barrel portion, a first sloping wall extending from one side of said barrel portion, a second sloping wall extending from an opposite side of said barrel portion and resilient finger means extending from said second sloping wall that are adapted to cooperate with said recess to maintain said sealing sleeve means on said terminal means between said tip and said collar whereby upon the securing of said coupling nut on said corresponding fitting, said sealing sleeve means engages said mounting portion of said terminal means and said second sloping wall of said sealing sleeve means engages said fitting to provide a fluid tight hookup between said terminal means and said fitting.

10. A plumbing coupling assembly as set forth in claim 9 wherein said finger means includes a plurality of fingers, each of said fingers having a nip extending radially inwardly so as to become lodged in said annular recess when said sealing sleeve means is positioned on said mounting means.

11. A plumbing coupling assembly as set forth in claim 10 wherein each of said nips will become dislodged from said recess when said tip is positioned on a surface and a force is applied to said sealing sleeve means toward said tip.

12. A plumbing coupling assembly as set forth in claim 10 wherein said second sloping wall is at a relatively shallow angle with respect to the longitudinal axis of said sealing sleeve means as compared to said first sloping wall.

13. A plumbing coupling assembly as set forth in claim 12 wherein said first sloping wall is at an angle of approximately 45 degrees with respect to the longitudinal axis of said sealing sleeve means and said second sloping wall is at an angle of approximately 15 degrees with respect to the longitudinal axis of said sealing sleeve means.

14. A plumbing coupling assembly as set forth in claim 13 wherein said fitting wedges against said second sloping wall as said coupling nut is secured on said fitting to provide a fluid tight connection between said fitting and said sealing sleeve means and a fluid tight connection between said sealing sleeve means and said terminal.

15. A plumbing coupling assembly for connecting a fluid connection having a male threaded fitting of a particular size and type that cooperates with a mating threaded coupling nut, said coupling nut including an apertured wall, said hookup kit comprising:

a flexible tubing;

a generally cylindrical terminal means being secured at least at one end of said tubing, said terminal means having a securing portion for securing said terminal means to said tubing and a mounting portion that is adapted to be extended through said apertured wall, said mounting portion having an annular recess defined between a pair of annular collars;

a pair of split locking ring means adapted to be mounted together on said mounting means to form a locking ring means, each of said split locking ring means having an inner annular projection to be disposed in said recess of said mounting portion, an inner annular groove to receive one of said collars and an outer annular groove; and a relative flexible sealing ring means having a bore therethrough so as to be positioned on said mounting portion, said sealing ring means having a annular inner projection that is adapted to be disposed in said outer annular groove to maintain said split locking ring means on said mounting portions whereby upon the securing of said coupling nut on said corresponding fitting, said sealing ring means engages said mounting portion of said terminal means and said fitting to provide a fluid tight hookup between said terminal means and said fitting.

16. A plumbing coupling assembly as set forth in claim 15 wherein said sealing ring means is made of rubber.

17. A plumbing coupling assembly as set forth in claim 15 wherein said sealing ring means has at least one sloped outer wall surface that engages said fitting and each of said split locking ring means having a wall that is engaged by said coupling nut when said coupling nut is secured onto said corresponding fitting.

18. A plumbing coupling assembly as set forth in claim 15 wherein said sealing ring means has a curved outer wall surface that engages said fitting when said coupling nut is secured onto said corresponding fitting.

19. A plumbing hookup kit for establishing a fluid tight connection to at least three different fluid connections, each of which said fluid connections including a male threaded fitting of a particular size and type that cooperates with a mating threaded coupling nut, each said coupling nut including an apertured wall, said hookup kit comprising:

a flexible tubing;

at least one generally cylindrical terminal means, said terminal means being secured at an end of said tubing and having a securing portion for securing said terminal means to said tubing and a mounting portion that is adapted to be extended through said apertured wall; and sealing means adapted to be positioned on said mounting portion of said terminal means, said sealing means being adapted to connect said terminal means with a particular one of said different fluid connections in a fluid tight relationship when said coupling nut is secured on said fitting of said particular one of said different fluid connection, said sealing means including a brass ferrule adapted to be positioned on said mounting means for providing a fluid tight connection to one of said at least three different fluid connections, a sealing sleeve adapted to be retained on said mounting means by resilient finger means for providing a fluid tight connection to a second of said at least three different fluid connections and split locking ring means adapted to be retained on said mounting portion by a sealing ring means for providing a fluid tight connection to a third of said at least three different fluid connections.

20. A plumbing hookup kit as set forth in claim 19 wherein terminal means has an annular recess adjacent a distal end of said mounting portion and wherein said resilient finger means includes a plurality of resilient fingers, each of which fingers has a nip extending radially inwardly so as to become lodged in said annular recess to maintain said sealing sleeve on said mounting means.

21. A plumbing hookup kit as set forth in claim 20 wherein each of said nips will become dislodged from said recess when said distal end is positioned on a surface and a force is applied to said sealing sleeve toward said distal end.

22. A plumbing hookup kit as set forth in claim 19 wherein said sealing sleeve is made of a plastic material and includes a central barrel portion and a pair of sloped walls extending in opposite directions from said barrel portion, one of said sloped walls engaging said fitting to which said terminal means is being connected and the other of said sloped walls engaging an angled wall of said coupling nut as said coupling nut is tighten unto said fitting.

23. A plumbing hookup kit as set forth in claim 19 wherein said split locking ring means includes a pair of locking rings having interlocking means to position each of said locking rings on said mounting portion of said terminals means and retaining means to secure said sealing ring means about said pair of locking rings to thereby retain said locking rings in position on said mounting means.

24. A plumbing hookup kit as set forth in claim 23 wherein said interlocking means includes an inwardly extending locking projection to be received in an annular recess in said mounting portion and an inner annular groove for receiving an annular collar on said mounting portion and wherein said retaining means includes an outer annular groove to receive a sealing projection extending inwardly on said sealing ring means.

* * * * *